March 31, 1959 W. C. MICHAL ET AL 2,879,582

METHOD OF MAKING COPPER OXIDE RECTIFIERS

Filed Dec. 31, 1953 2 Sheets-Sheet 1

INVENTORS W.C. MICHAL
W.J. TESCHE
BY John C. Moris
ATTORNEY

METHOD OF MAKING COPPER OXIDE RECTIFIERS

Filed Dec. 31, 1953 2 Sheets-Sheet 2

INVENTORS W. C. MICHAL
W. J. TESCHE
BY John C. Morris
ATTORNEY

United States Patent Office 2,879,582

Patented Mar. 31, 1959

2,879,582

METHOD OF MAKING COPPER OXIDE RECTIFIERS

William C. Michal, Morristown, N.J., and Walter J. Tesche, Coopersburg, Pa.; said Michal assignor to Bell Telephone Laboratories, Incorporated, New York, N.Y., a corporation of New York, and said Tesche assignor to Western Electric Company, Incorporated, New York, N.Y., a corporation of New York Application December 31, 1953, Serial No. 401,632

10 Claims. (Cl. 29—25.3)

This invention relates to the manufacture of dry, surface contact rectifiers and more particularly to such rectifiers comprising a metal body having a layer of its oxide thereon.

Metal oxide-metal rectifiers, such as copper oxide-copper rectifiers are made by subjecting a body of the metal or a part thereof to an oxidizing atmosphere. Copper oxide rectifiers are usually made from discs, washers or plates of suitable copper oxidized on one face and provided with an electrode on the surface of the oxide. One of the problems of such manufacture is to avoid or inhibit, as much as possible, leakage paths, i.e. paths of relatively high current carrying ability in the intended low current direction.

An object of this invention is to improve the quality of copper oxide rectifiers, whereby there is obtained a greater uniformity of product with an enhanced rectification ratio.

A feature of this invention resides in the step of manufacturing copper oxide rectifiers that includes removing discs or plates from a copper blank and then re-inserting them in the blank or in an orifice in another copper sheet prior to oxidizing.

Another feature of this invention lies in oxidizing one face of the discs and of the surrounding blank together and then removing the discs from the blank by pressing them out toward the oxidized face.

Other and further objects and features of this invention will appear more fully and clearly from the following description of an exemplary embodiment and in connection with the appended drawings in which.

Figure 1:
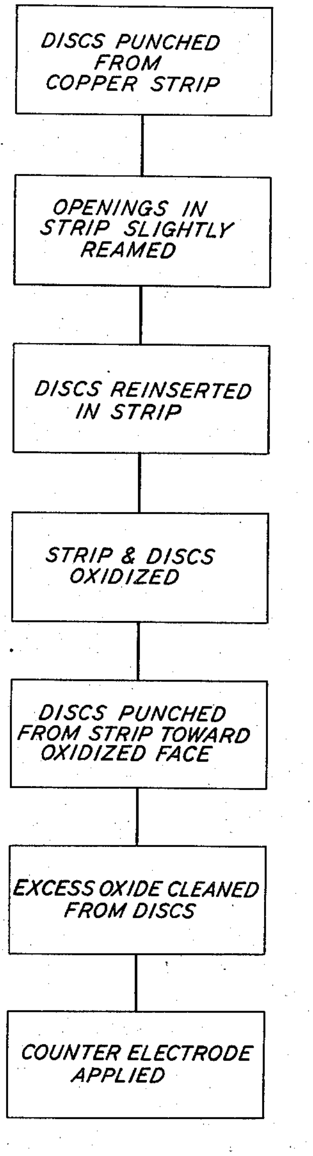
Fig. 1 is a diagrammatical representation of the steps in the process of this invention.

The process of this invention may be performed with various tools, those included in the ensuing description being selected for convenience of description. The process is outlined in Fig. 1 and starts with the removal of discs from a strip of copper that is suitable for making copper oxide rectifiers.

Figure 2:
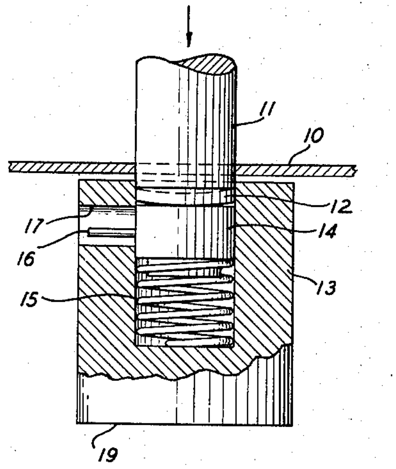
Fig. 2 shows a disc being punched from a metal blank.

In Fig. 2 there is shown a portion 10 of a copper blank, which, in this case, is in strip form. The punch 11 severs the disc 12 from the copper strip pushing it into the die 13 on top of the backing plunger 14. The plunger 14 is urged upwardly by the spring 15 and is limited in its movement by the pin 16 in the slot 17.

Figure 3:
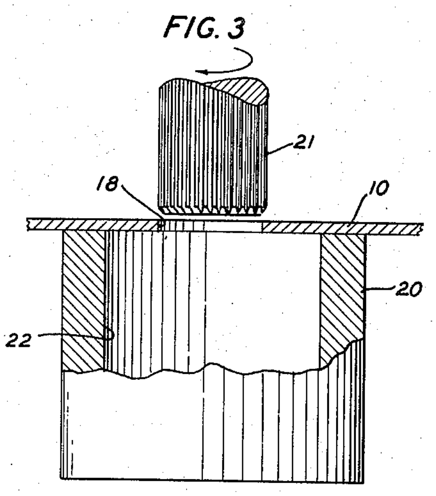
Fig. 3 shows a reamer positioned over a hole in the metal blank from which a disc has been punched.

The strip 10 is then placed over a suitable backing means 20 as illustrated in Fig. 3 and the hole 18 from which the disc 12 was removed is reamed by the reamer 21 to enlarge it slightly. For discs of about 1/16 inch diameter a suitable enlargement is about 3 mils. For example, so-called 1/16 inch copper discs for rectifiers are punched from copper sheet about 25 mils in thickness and range from 0.0615 inch to 0.0625 inch in diameter. The holes in the copper blank from which such discs are punched are, due to flow of the copper, about 0.0580 inch in diameter. Such holes are for this process enlarged to 0.0610 inch diameter.

Figures 4, 5, 6:
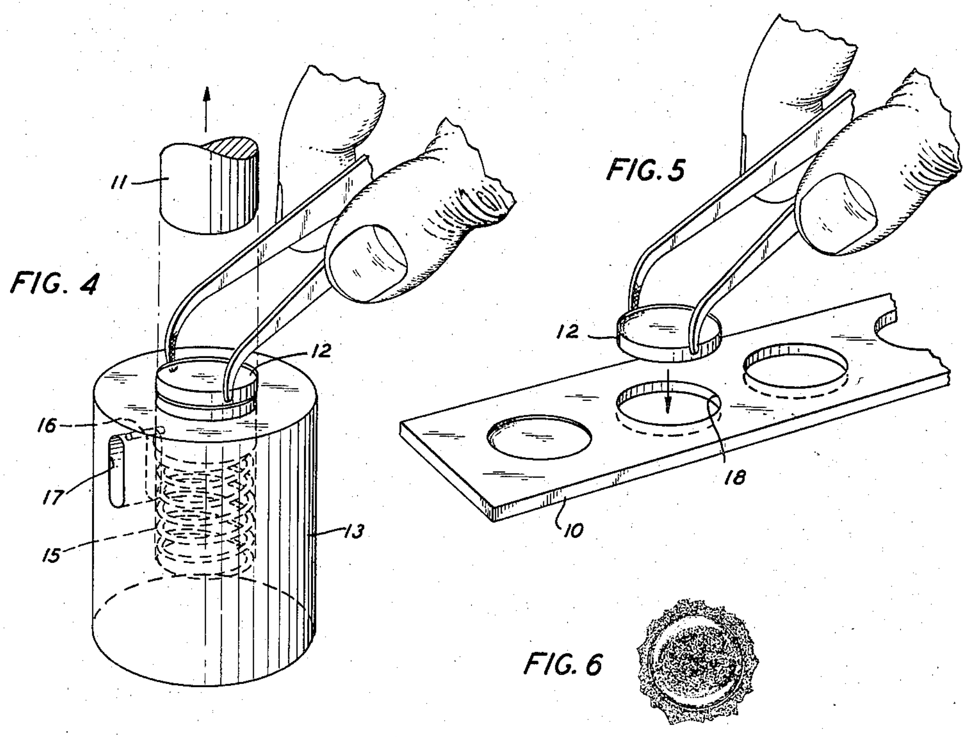
Fig. 4 shows a disc being removed from the punching die.
Fig. 5 shows a disc being replaced in a reamed hole in the metal blank.
Fig. 6 shows an oxidized disc with an irregular flange of copper oxide thereon.

The disc 12 is then removed from the die 13, the plunger 11 having been raised as illustrated in Fig. 4. The disc 12 is then replaced in the strip 10 as indicated in Fig. 5. Since the disc 12 is slightly greater in diameter than the hole 18 and since it is advantageous to have the disc flush with the strip surface, an arbor or like means is used to press the disc into the hole. For example, the die 13 may be turned over so that its flat surface 19 faces the punch 11. With the strip 10 placed on the surface 19, the punch may be used to press the disc into the hole 18.

As indicated in Fig. 2 the disc 12 is slightly dished by the punching operation (exaggerated in Fig. 2 in the interest of illustration). Since it is desirable that the convex face be oxidized, the discs are all inserted in the strip with their convex faces toward the same side.

The strip with the inserted discs is then heated to about 1000° C. for from 10 to 15 minutes in the presence of an oxygen containing atmosphere to form a copper oxide coating on the convex faces of the discs and the surrounding surface of the strip. The backs of the discs and of the strip are protected from the oxidizing atmosphere by suitable means. For example, they may be clamped to backing strips of refractory material. The discs and strip are then annealed at about 550° C. for about 7 minutes.

After the oxidizing treatment is complete, the discs are removed from the strip by pressing them out toward the oxidized side. This may be done by means of an arbor pressing on the copper side of the disc, which is positioned over an orifice in a suitable die or backing member, for example, the backing member 20 may be used with the punch 11 serving as the arbor. The orifice 22 in the member 20 should have a diameter considerably greater than that of the disc. An orifice diameter at least twice that of the disc is suitable. The large diameter of the die orifice allows the copper oxide to break away from the strip at a considerable distance from the periphery of the disc, thus inhibiting cracking of the oxide on the disc face. Due to the slight convexity of the disc surface, there is a tiny V-groove between the disc and the copper strip. During oxidation this groove becomes substantially filled with oxide, fusing the disc and the strip together. The thicker annular ring of oxide is stronger than the remaining oxide so that there is less tendency to break here when the oxidized discs are pressed out of the strip. This stronger ring of oxide plus the backing zone remote from the disc edge substantially insure against oxide cracking on the disc surface or the corner of the disc edge.

The discs are then treated in a hot solution of dilute sulphuric acid to remove the excess copper oxide around their edges. A suitable solution comprises 98 parts water and 2 parts sulphuric acid heated to about 80° C. The discs are left in the solution just long enough to remove the excess oxide and then removed, rinsed and dried. A time of about 4 minutes is suitable for cleaning 1/16 inch discs.

Copper when oxidized in the manner noted or in a similar manner has an adhering cuprous oxide on its surface and a coating of cupric oxide on the surface of the cuprous oxide. The sulphuric acid treating solution attacks cuprous oxide more readily than cupric oxide. The removal of oxide is thus selective since the flange portion of oxide has an undersurface of cuprous oxide and the disc proper has the cupric oxide overlay.

The disc is then provided with a counterelectrode on the surface of the copper oxide and becomes a rectifier disc or unit. The electrode may be of gold, silver or other suitable conductive material. Gold or silver electrodes may be applied as set forth in the Patent 2,239,770 to J. A. Becker and W. H. Brattain, issued April 29, 1941. Since in this process the edges of the rectifier discs have not been oxidized except at the corner adjacent the oxidized surface, a relatively long leakage path results. The "back" current is, therefore, kept to a desirably low minimum. Furthermore, since there is no cracking of the oxide on the disc face or edge, the oxide removal is quite uniform, thereby greatly increasing the yield of usable discs.

It will be obvious to those skilled in the art that known manufacturing expedients may be employed in the practice of this process on a production basis, the means described being but exemplary.

What is claimed is:

1. The method of making copper oxide rectifiers that comprises removing discs of copper from a copper sheet, slightly enlarging the resulting orifices in the sheet, replacing the discs in the orifices flush with the sheet, oxidizing one face of the sheet and of the discs, pressing on the unoxidized side of the discs to remove them from the sheet with a thin flange of copper oxide thereon, selectively dissolving the flange, and applying a counterelectrode to the copper oxide surface of each disc.

2. The method of making copper oxide rectifiers that comprises punching discs of copper from a copper sheet, whereby the resulting orifices are of less diameter than the discs, slightly enlarging said orifices, placing the discs in the orifices flush with the sheet, oxidizing one face of the sheet and of the discs, pressing on the unoxidized side of the discs to remove them from the sheet with a thin flange of copper oxide thereon, selectively dissolving the flange in dilute sulphuric acid, and applying a counterelectrode to the copper oxide surface of each disc.

3. The method of making copper oxide rectifiers that comprises punching discs of copper from a copper sheet, slightly enlarging the resulting orifices in the sheet, pressing the discs into the enlarged orifices flush with the sheet, oxidizing one face of the discs and of the sheet, applying pressure to the unoxidized side of each disc while supporting the sheet on the other side in a zone surrounding each disc and spaced from the periphery thereof a distance equal to or greater than the radius of each disc to remove the discs from the sheet with a peripheral flange of oxide thereon, dissolving said flange, and applying a counterelectrode to the copper oxide surface of each disc.

4. The method of making copper oxide rectifiers that comprises punching plates of copper from a copper sheet, slightly enlarging the resulting orifices in the sheet, pressing the plates into the enlarged orifices flush with the sheet, oxidizing one face of the plates and of the sheet, applying pressure to the unoxidized side of each plate while supporting the sheet on the other side in a zone surrounding each plate and spaced from the periphery thereof a distance equal to or greater than one-half the minimum lateral extent of each plate to remove the plates from the sheet with a peripherial flange of oxide thereon, dissolving said flange in dilute sulphuric acid, and applying a counterelectrode to the copper oxide surface of each plate.

5. The method of making copper oxide rectifiers that comprises forming a copper disc that is slightly dished, providing a sheet of copper with an orifice of slightly less diameter than said disc, pressing said disc into the orifice so that its convex surface is substantially flush with the surface of the sheet, oxidizing the convex surface of the disc and the surrounding sheet, applying pressure to the concave side of the disc while supporting the sheet in a zone spaced from the periphery of the disc to remove the disc from the sheet with a projecting flange of copper oxide thereon, dissolving the flange, and applying a counterelectrode to the oxide surface.

6. The method of making copper oxide rectifiers that comprises forming a copper disc having a slightly convex face, providing a sheet of copper with an orifice of slightly less diameter than said disc, pressing said disc into the orifice so that its convex face is substantially flush with a face of the sheet, oxidizing the convex face of the disc and the face of surrounding sheet, applying pressure to the unoxidized side of the disc while supporting the sheet in a zone spaced from the periphery of the disc to remove the disc from the sheet with a projecting flange of copper oxide thereon, dissolving the flange, and applying a counterelectrode to the oxide surface.

7. The method of making copper oxide rectifiers that comprises forming a copper disc that is slightly dished, providing a sheet of copper with an orifice of slightly less diameter than said disc, pressing said disc into the orifice so that its convex surface is substantially flush with the surface of the sheet and there is a shallow annular groove around the disc adjacent the convex surface, oxidizing the convex surface of the disc and the surrounding sheet whereby said groove is substantially filled with copper oxide, applying pressure to the concave side of the disc while supporting the sheet in a zone spaced from the periphery of the disc to remove the disc from the sheet with a projecting flange of copper oxide thereon, dissolving the flange, and applying a counterelectrode to the oxide surface.

8. The method of making a copper oxide rectifier that comprises forming a copper disc having a slightly convex surface, providing a sheet of copper with an orifice slightly less in diameter than said disc, inserting the disc in the orifice so that the convex surface thereof is substantially flush with the surface of the sheet, subjecting the convex surface of the disc and the surrounding surface of the sheet to oxidation to form a layer of cuprous oxide on said surfaces, and also to form a layer of cupric oxide over the cuprous oxide, applying pressure to the unoxidized face of the disc while supporting the sheet annularly outside of the disc periphery to remove the oxidized disc with a flange of copper oxide extending beyond the edge of said copper disc, said flange having an exposed surface of cuprous oxide, placing the disc in a dilute sulphuric acid solution to dissolve the cuprous oxide at a more rapid rate than the cupric oxide thereby removing the flange before the cuprous oxide on the disc surface is dissolved, and applying a counterelectrode to the cuprous oxide surface of the disc.

9. The method of making a copper oxide rectifier that comprises forming a copper disc having a slightly convex surface, providing a sheet of copper with an orifice slightly less in diameter than said disc, inserting the disc in the orifice so that the convex surface thereof is substantially flush with the surface of the sheet and that portion of the edge of the disc adjacent the convex surface forms with the adjacent edge of the orifice a shallow, peripheral groove around the disc, subjecting the convex surface of the disc, the surface of the peripheral groove, and the surrounding surface of the sheet to oxidation to form a layer of copper oxide on said surfaces including an annular ring of copper oxide of greater thickness than said layers in said groove, applying pressure to the unoxidized face of the disc while supporting the sheet annularly outside of the disc periphery to remove the oxidized disc with a flange of copper oxide extending beyond said annular ring of copper oxide, placing the disc in a dilute sulphuric acid solution to dissolve the flange, and applying a counterelectrode to the copper oxide surface of the disc.

10. The method of making a copper oxide rectifier that comprises forming a copper disc having a slightly convex surface, providing a sheet of copper with an orifice slightly less in diameter than said disc, inserting the disc in the orifice so that the convex surface thereof is substantially flush with the surface of the sheet and that portion of the edge of the disc adjacent the convex surface forms with the adjacent edge of the orifice a shallow, peripheral groove around the disc, subjecting the convex surface of the disc, the surface of the peripheral groove, and the surrounding surface of the sheet to oxidation to form a layer of cuprous oxide on said surfaces, including an annular ring of cuprous oxide of greater thickness than said layer in said groove, and also to form a layer of cupric oxide over the cuprous oxide; applying pressure to the unoxidized face of the disc while supporting the sheet annularly outside of the disc periphery to remove the oxidized disc with a flange of copper oxide extending beyond said annular ring of cuprous oxide, said flange having an exposed surface of cuprous oxide, placing the disc in a dilute sulphuric acid solution to dissolve the cuprous oxide at a more rapid rate than the cupric oxide thereby removing the flange before the cuprous oxide on the disc surface is dissolved, and applying a counterelectrode to the cuprous oxide surface of the disc.

References Cited in the file of this patent

UNITED STATES PATENTS

| | | |
|---|---|---|
| 2,094,642 | Dowling | Oct. 5, 1937 |
| 2,392,744 | Kallmeyer | Jan. 8, 1946 |